United States Patent [19]
Siddiqui

[11] Patent Number: 5,939,468
[45] Date of Patent: *Aug. 17, 1999

[54] BLUSH RESISTANT INVISIBLE FLUORESCENT JET INK

[75] Inventor: Mohammed W. Siddiqui, Carol Stream, Ill.

[73] Assignee: Videojet Systems International, Inc., Wooddale, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/686,191

[22] Filed: Jul. 26, 1996

[51] Int. Cl.⁶ .................................................. C09D 5/00
[52] U.S. Cl. ............................................... 523/161
[58] Field of Search ............................................. 523/161

[56] References Cited

U.S. PATENT DOCUMENTS

| | | | |
|---|---|---|---|
| 3,674,729 | 7/1972 | Mirick | 524/556 |
| 4,186,020 | 1/1980 | Wachtel . | |
| 4,243,694 | 1/1981 | Mansukhani | 524/89 |
| 4,540,595 | 9/1985 | Acitelli et al. | 427/7 |
| 4,610,806 | 9/1986 | Rosen | 252/301.16 |
| 4,707,297 | 11/1987 | Paske | 252/301.16 |
| 4,736,425 | 4/1988 | Jalon | 380/59 |
| 5,093,147 | 3/1992 | Andrus et al. | 427/7 |
| 5,114,478 | 5/1992 | Auslander et al. . | |
| 5,242,489 | 9/1993 | Schwarz | 106/20 D |
| 5,286,286 | 2/1994 | Winnik | 106/21 A |
| 5,554,842 | 9/1996 | Connell | 524/258 |
| 5,569,317 | 10/1996 | Sarada | 524/111 |
| 5,614,008 | 3/1997 | Escano | 524/81 |
| 5,710,195 | 1/1998 | Subbaramann | 524/31 |

FOREIGN PATENT DOCUMENTS

| | | |
|---|---|---|
| 3529798 | 2/1987 | Germany . |
| 4013456 | 10/1991 | Germany . |
| 53-140105 | 12/1978 | Japan . |
| 1-135683 | 5/1989 | Japan . |
| 7118590 | 5/1995 | Japan . |
| 1 577 902 | 10/1980 | United Kingdom . |

*Primary Examiner*—Paul R. Michl
*Attorney, Agent, or Firm*—Leydig, Voit & Mayer, Ltd.

[57] ABSTRACT

Disclosed are jet ink compositions suitable for producing marks on objects that are invisible to the unaided eye and are visible only when excited by an exciting radiation comprising a solvent, a fluorescent colorant, a binder resin, and a plasticizer having a vapor pressure of about 15 mm Hg or less at 240° C. Examples of suitable binder resins include an acrylic resin, a toluenesulfonamide resin, and a sulfonamide-formaldehyde resin. An example of a suitable plasticizer is o-butyl benzyl phthalate. The marks are blush resistant when exposed to water at 150° F. and above for 5 minutes. Also disclosed is an improved method of identifying objects, the improvement comprising providing a blush resistant identifying mark using the inventive jet ink compositions. A system for identifying objects with a blush resistant identification mark is also disclosed.

58 Claims, 2 Drawing Sheets

BLUSH RESISTANT INVISIBLE FLUORESCENT JET INK

TECHNICAL FIELD OF THE INVENTION

The present invention generally relates to ink jet printing fluorescent ink compositions, and particularly to ink jet printing fluorescent ink compositions whose marks do not blush when exposed to water.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well-suited for application of characters onto irregularly shaped surfaces, including, for example, the bottom of glass, metal, or plastic containers, used for holding cosmetic, pharmaceutical, liquor, and health care products.

Reviews of various aspects of ink jet printing can be found these publications: Kuhn et al., *Scientific American*, Apr. 1979, 162–178; and Keeling, *Phys. Technol.*, 12(5), 196–303 (1981). Various ink jet apparatuses are described in the following U.S. Pat. Nos. 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components and wettability of the substrate. Further, the ink must be quick-drying, smear resistant, and be capable of passing through the ink jet nozzle without clogging, and permit rapid cleanup of the machine components with minimum effort.

The marking of articles such as bank checks, envelopes, certificates, and the like, as well as food containers such as metal, plastic or glass containers with identification marks for later identification and/or sorting is well known. Several methods have been proposed for producing such security or identification marks. For example, infrared readable bar codes have been proposed by the Japanese Patent Application Kokai No. 58-45999 to meet the need for invisible security marks. Thus, a voting card is printed with an infrared absorbing bar code, and the printed area is covered by smearing with an ink which has high light absorptivity in the visible region but low light absorptivity in the infrared region. This method has the problem of producing disagreeable visual images because of the black color of the ink which has low light absorptivity in the infrared region. This method also has the problem that it is incapable of perfectly concealing the bar code in order that it would be invisible to the unaided eye.

U.S. Pat. No. 5,366,252 discloses another method of concealing the infrared absorbing bar code. An infrared absorbing mark formed by printing on a substrate is covered up by smearing with an ink having high light absorptivity in the visible region and pervious to light in the infrared region, thus forming a colored concealing layer on the mark, and on this colored concealing layer there is further provided a white concealing layer containing a white pigment and an extender pigment of which at least part of the particles have an average size of 3 to 20 microns.

The aforesaid methods have the disadvantage that the infrared absorbing bar codes are to some extent visible to the unaided eye and need to be physically concealed. The concealment of the bar code results in covering up of a portion of the article, thereby adversely affecting the aesthetics of the article.

Fluorescent materials have been considered for marking purposes. It is known that fluorescence is the property of a material to emit radiation as the result of exposure to radiation from some other source. The emitted radiation persists only as long as the exposure is subjected to radiation. The fluorescent radiation generally has a longer wavelength than that of the absorbed radiation.

There has been significant developmental activity in the area of fluorescent jet inks for producing security marks on envelopes and documents. For instance, U.S. Pat. No. 5,093,147 discloses a method for providing intelligible marks that are virtually invisible to the unaided eye on the surface of an article. The invention is based on a jet ink containing an organic laser dye that is poorly absorptive in the visible range of about 400 to 700 nm, is absorptive of radiation in the near infrared range of at least 750 nm, and fluoresces in response to radiation excitation in the infrared range at a wavelength longer than that of the exciting radiation.

U.S. Pat. No. 4,736,425 discloses a method of marking fiduciary documents requiring authentication by the use of certain fluorescent chelates. The method comprises introducing only a part of the elements forming the chelate onto the document to be marked and subsequently contacting the document for authentication purpose with the missing part of the elements forming the chelate to effect the synthesis of the fluorescent chelate. The chelate thus formed is excited by ultraviolet radiation and the resulting fluorescence radiation is detected.

U.S. Pat. No. 4,450,595 discloses a jet ink that can be used to mark documents such as bank checks for automatic identification. The ink contains certain phenoxazine derivative dyes that are visible to the unaided eye and fluoresce in the near infrared region (650 to 800 nm) upon activation using an activating light having a wavelength in the range of 550 to 700 nm. The ink that is visible to the unaided eye is unfortunately not suitable for many security mark applications.

Commonly owned and copending U.S. patent application Ser. No. 08/661,180, filed Jun. 10, 1996, discloses jet ink compositions suitable for mark on white or light colored substrates such as envelopes. The ink composition comprises a fluorescent colorant and an ink carrier. The mark produced by the ink composition is completely or substantially invisible to the unaided eye and is visible only when excited by ultraviolet light.

In the area of marking objects such as metals, the following publications are of interest. German Patent DE 3529798 reportedly discloses a jet ink for placing on metals, plastics, paper or glass identification marks that are invisible to the naked eye consisting of an alcohol solvent, a fluorescent substance that is soluble in a water/ethanol mixture, a water-soluble polyacrylate, and optionally a water-soluble cellulose ester and diethanolamine.

German Patent DE 4013456 reportedly discloses a jet ink containing an organic solvent, a fluorescent dyestuff, a polyamic acid or polyimide binder resin, and conductive salts. The ink is said to adhere well to glass ceramic and copper.

The foregoing indicates that there exists a need for a jet ink composition comprising a fluorescent colorant suitable for printing identification marks on metals, glass, ceramics, and plastics.

Metal containers such as, for example, empty containers used to bottle air fresheners, mosquito repellants, shaving creams, carpet cleaners, oven cleaners, automobile body shine boosters, primers, and the like, are shipped to the fillers with identification marks placed thereon by the container manufacturer. At the fillers' premises, the containers are subjected to leak testing by immersing the filled containers in hot water. The leak testing typically is carried out by immersing the containers in water at 150° F. for 5 minutes. It has been a problem with the previously known fluorescent jet ink compositions that the marks tend to blush when exposed to the hot water. As a result, the marks become visible to the unaided eye, and thus easily readable by the filler. Manufacturers would prefer to keep the marks, which may contain proprietary information, confidential.

Thus, there exists a need for a jet ink composition suitable for printing on containers marks that do not blush when exposed to warm and humid conditions, particularly those encountered during the leak testing of filled containers.

Furthermore, during the manufacture of metal containers, the containers are exposed to high temperatures to effect the curing of the coatings applied to the containers. The containers may be exposed to temperatures in the range of from about 350° F. to about 700° F. Typically, the containers are exposed up to about 390° F. for about 30 seconds. The identification marks should be able to resist the heat exposure. Thus, there exists a need for a jet ink composition that produces a mark which resists such a heat exposure.

These and other objects of the present invention will be apparent from the detailed description of the preferred embodiments of the invention set forth below.

BRIEF DESCRIPTION OF THE DRAWINGS

In FIGS. 1–4, the horizontal axis represents the absorption or emission wavelength and the vertical axis represents emission or absorption in an arbitrary percent scale. Solid lines represent absorption spectra, and broken lines represent emission spectra.

In FIGS. 2–4, the concentration of the colorant was 2 parts per million (ppm) for obtaining the absorption spectra, and 6.33 ppm for obtaining the emission spectra.

SUMMARY OF THE INVENTION

The foregoing needs have been fulfilled by the present invention which provides a jet ink composition comprising a fluorescent colorant suitable for printing identification marks on metals, glass, plastic, or ceramics.

The present invention further provides a jet ink composition suitable for producing blush resistant marks that are invisible to the unaided eye and are visible only when excited by an exciting radiation comprising a solvent, a fluorescent colorant, a binder resin, and a plasticizer having a vapor pressure of about 15 mm Hg or less at 240° C.

The present invention further provides a method of providing a blush resistant mark on a substrate for subsequent identification comprising applying onto said substrate a jet ink composition comprising a solvent, a fluorescent colorant, a binder resin, and a plasticizer having a vapor pressure of about 15 mm Hg or less at 240° C., and removing all or substantially all of said solvent.

The present invention further provides a jet ink composition suitable for printing marks that are heat resistant comprising a solvent, a fluorescent colorant, a binder resin, and a plasticizer having a vapor pressure of about 15 mm Hg or less at 240° C.

The present invention further provides an improved method of identifying objects comprising providing an identifying mark on the objects, exciting the mark with an excitation radiation to obtain an emission radiation, and reading the emission radiation, the improvement comprising providing a blush resistant identifying mark using a jet ink composition comprising a solvent, a fluorescent colorant, a binder resin, and a plasticizer having a vapor pressure of about 15 mm Hg or less at 240° C.

The present invention further provides a system for identifying objects with an identification mark comprising an excitation means for exciting the mark and a fluorescence detecting means for detecting the fluorescent emission of said mark, wherein the mark is blush resistant and comprises a fluorescent colorant, a binder resin, and a plasticizer having a vapor pressure of about 15 mm Hg or less at 240° C.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides jet ink compositions suitable for printing marks that are invisible to the unaided eye and are visible only when excited by an exciting radiation.

The present invention further provides jet ink compositions suitable for producing blush resistant marks that are invisible to the unaided eye and are visible only when excited by an exciting radiation.

The present invention further provides a jet ink composition suitable for printing on objects marks that are heat resistant.

The jet ink composition of the present invention comprises a solvent, a fluorescent colorant, a binder resin, and a plasticizer having a vapor pressure of about 15 mm Hg or less at 240° C.

GENERAL PROPERTIES

In general, the ink compositions of the present invention exhibit the following characteristics for use in ink jet printing systems: (1) a Brookfield viscosity of from about 1.6 to about 7.0 centipoises (cps) at 25° C.; (2) an electrical resistivity of from about 20 to about 2000 ohm-cm; and (3) a sonic velocity of from about 1100 to about 1700 meters/second.

A detailed discussion of the components of the inventive jet ink composition is set forth below.

FLUORESCENT COLORANTS

Any suitable fluorescent colorant that is substantially or completely invisible to the unaided eye can be used in the preparation of the inventive ink composition. The fluorescent colorant absorbs outside the visible range, and fluoresces at a wavelength longer than the absorption wavelength. Preferably, the fluorescent colorant absorbs in the wavelength region of from about 275 nm to about 400 nm and emits in the wavelength region of from about 420 nm to about 520 nm. A fluorescent colorant that emits a blue line is further preferred.

Figure 1:
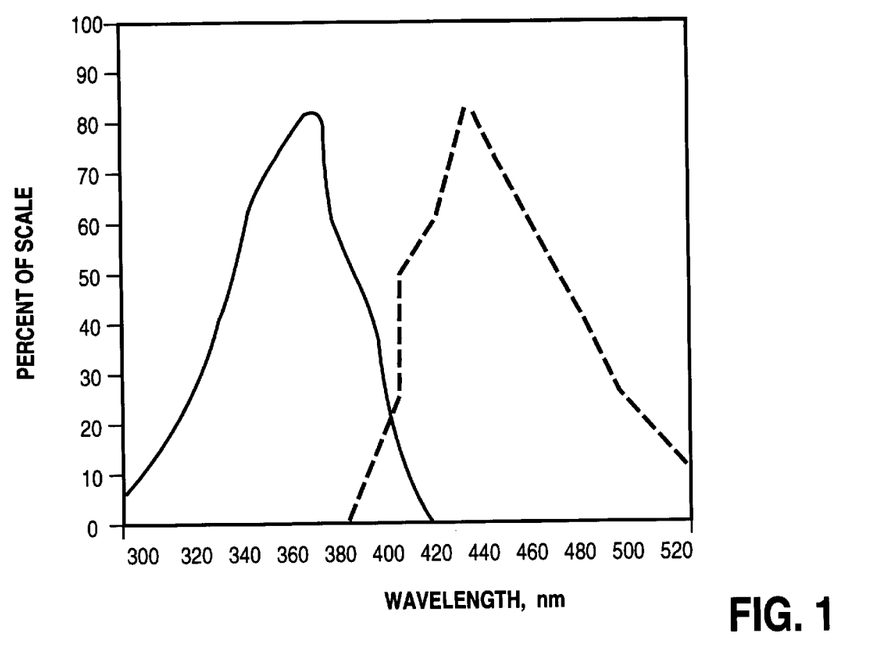
FIG. 1 depicts the absorption and emission spectra of the fluorescent colorant, UVITEX OB™.

An example of a suitable fluorescent colorant is 2,2'-(2, 5-thiophenediyl)-bis(5-tert-butylbenzoxazole), which is available as UVITEX OB from Ciba-Geigy Corp. in Hawthorne, N.Y. UVITEX OB is a yellow crystalline powder having a melting point of 197°–203° C. It has good lightfastness, excellent resistance to heat, and high chemical stability. UVITEX OB can be heated for 8 hours at 300° C. in a nitrogen atmosphere without decomposition. The colorant also can be heated for the same period at 200° C. in air without decomposition. UVITEX OB has an absorption maximum at 375 nm (extinction coefficient 1,200 at 1%, 1 cm) and a fluorescence maximum at 435 nm when measured in ethanol solution, as shown in FIG. 1. The colorant produces a blue fluorescence. UVITEX OB is known to be useful as an optical brightener in plastics.

Examples of other optical brighteners can be found in *Kirk-Othmer Encyclopedia of Chemical Technology*, 4, "Fluorescent Brighteners", pp. 213–225 (1978), and include the stilbene derivatives such as 4,4'-bis(triazin-2-ylamino) stilbene-2,2'-disulfonic acid derivatives wherein the triazinyl groups are substituted with suitable substituents, including substituents such as anilino, sulfanilic acid, metanilic acid, methylamino, N-methyl-N-hydroxyethylamino, bis (hydroxyethylamino), morpholino, diethylamino, and the like; mono(azol-2-yl)stilbenes such as 2-(stilben-4-yl) naphthotriazoles and 2-(4-phenylstilben-4-yl)benzoxazoles; bis(azol-2-yl)stilbenes such as 4,4'-bis(triazol-2-yl)stilbene-2,2'-disulfonic acids; styryl derivatives of benzene and biphenyl such as 1,4-bis(styryl)benzenes and 4,4'-bis(styryl) biphenyls; pyrazolines such as 1,3-diphenyl-2-pyrazolines; bis(benzazol-2-yl) derivatives having as phenyl ring substituents alkyl, COO-alkyl, and $SO_2$ alkyl; bis(benzoxazol-2-yl) derivatives; bis(benzimidazol-2-yl) derivatives such as 2-(benzofuran-2-yl)benzimidazoles; coumarins such as 7-hydroxy and 7-(substituted amino)coumarins, 4-methyl-7-amino-coumarin derivatives, esculetin, β-methylumbelliferone, 3-phenyl-7-(triazin-2-ylamino) coumarins, 3-phenyl-7-aminocoumarin, 3-phenyl-7-(azol-2-yl)coumarins, and 3,7-bis(azolyl)coumarins; carbostyrils, naphthalimides, alkoxynaphthalimides, derivatives of dibenzothiophene-5,5-dioxide, pyrene derivatives, and pyridotriazoles.

Figure 2:
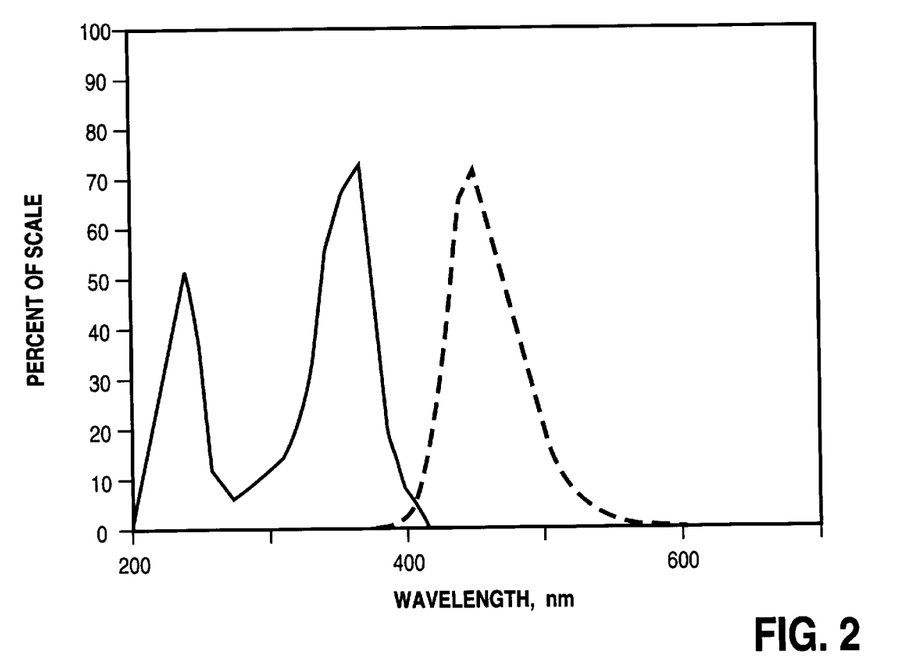
FIG. 2 depicts the absorption and emission spectra of the fluorescent colorant, CALCOFLUOR™ WHITE LD.
Figure 3:
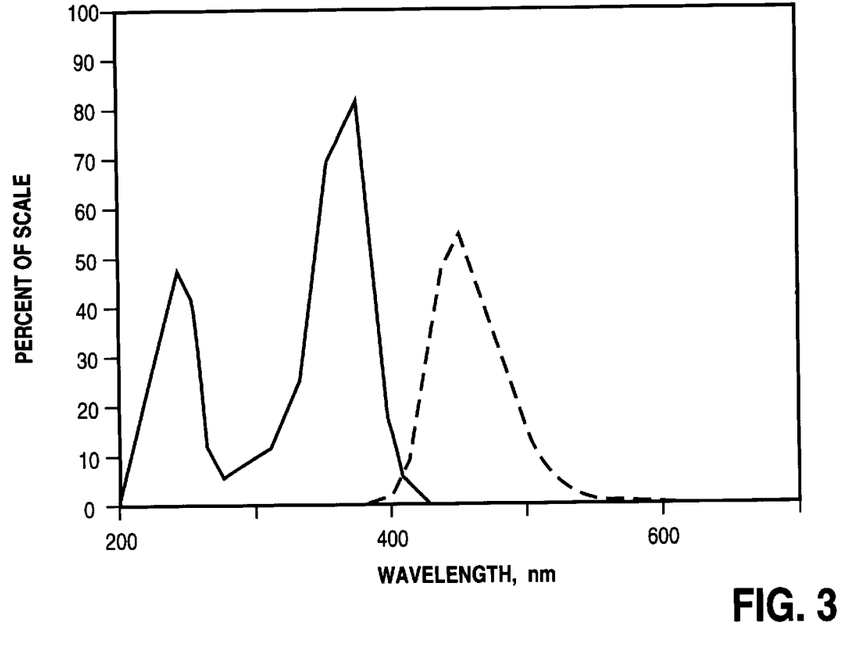
FIG. 3 depicts the absorption and emission spectra of the fluorescent colorant, CALCOFLUOR RWP Conc.
Figure 4:
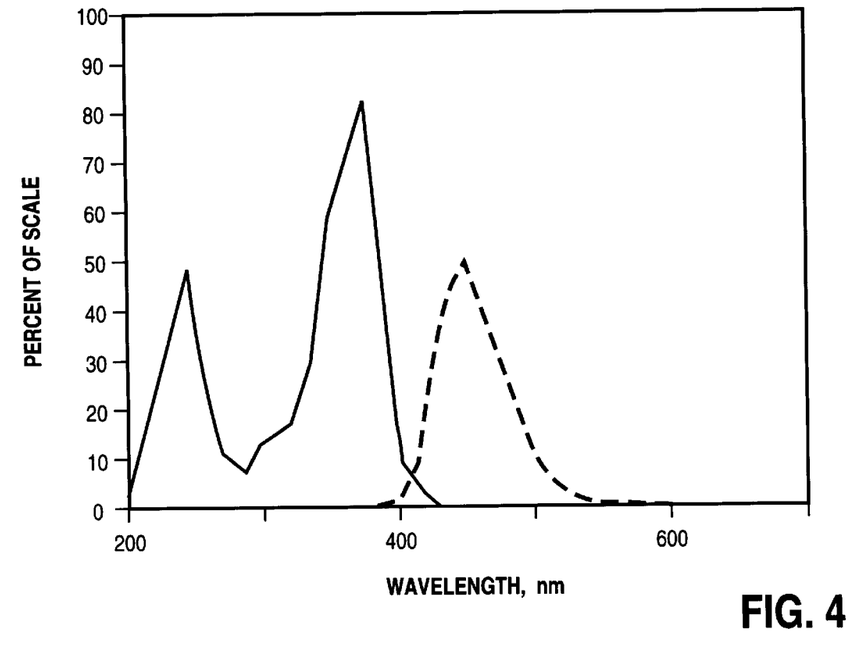
FIG. 4 depicts the absorption and emission spectra of the fluorescent colorant, CALCOFLUOR RW Solution.

Coumarin type fluorescent colorants can be obtained commercially from BASF Corp. in Holland, Mich. Thus, coumarin is sold as CALCOFLUOR WHITE LD or Fluorescent Brightener 130, which has an absorption maximum at 367.8 nm and an emission maximum at 450 nm, as shown in FIG. 2. Aminocoumarin is sold as CALCOFLUOR WHITE RWP Conc. or RW Solution. The aminocoumarins have an absorption maximum at 374.5 nm and an emission maximum at 450 nm, as shown in FIG. 3 (Conc.) and FIG. 4 (Solution).

Other examples of fluorescent colorants include rare earth metal chelates, and preferably, lanthanide chelates. Examples of lanthanide chelates include those formed by the chelation of organic ligands such as acetylacetone, benzoylacetone, dibenzoylmethane, and salicylic acid with lanthanide ions such as neodymium, europium, samarium, dysprosium, and terbium ions. Examples of such complexes include europium acetylacetonate, samarium acetylacetonate, neodymium benzoylacetonate, terbium salicylate, and dysprosium benzoylacetonate. The aforesaid chelates can be prepared by any suitable method known to those of ordinary skill in the art. For example, a ligand such as acetylacetone can be reacted under suitable conditions with a rare earth metal halide such as europium trichloride to produce the rare earth metal chelate. For additional details, see U.S. Pat. No. 4,736,425. The above chelates absorb ultraviolet radiation and fluoresce in the visible range. The acetylacetonate of europium fluoresces with an emission line in the red region and this is particularly suitable for printing on white or light colored substrates.

Examples of commercially available rare earth chelate fluorescent colorants suitable for use in the ink composition of the present invention include, but are not limited to, the rare earth metal chelates sold as LUMILUX C™ pigments by Hoechst-Celanese Corp. in Reidel-de Haen, Germany.

The LUMILUX C rare earth metal organic chelates have a melting point of from about 130° C. to about 160° C. and a bulk density of from about 500 $kg/m^3$ to about 1100 $kg/m^3$. Examples of organic LUMILUX C pigments include Red CD 316, Red CD 331, Red CD 332, Red CD 335, and Red CD 339, which are yellowish when unexcited and fluoresce in the orange-red region when excited by ultraviolet radiation. These pigments are soluble in organic solvents. Red CD 331, a preferred pigment and a derivative of europium-acetonate, is a yellowish powder having an emission peak at 612 nm, a melting point in the range of 153–155° C., and a density of 600 $kg/m^3$. Red CD 331 is soluble in acetone, ethylacetate, ethanol, xylene, dichloromethane, dimethylformamide, n-hexane, and dibutylphthalate. Red 316 is a rare earth acetylacetonate. Red CD 332, a rare earth biketonate, has a melting of 135–138° C. and a density of 500 $kg/m^3$. Red CD 335, an europium chelate, has a melting point of 133° C. and a density of 1030 $kg/m^3$.

Additional examples of suitable LUMILUX pigments include Red CD 105, Red CD 106, Red CD 120, and Red CD 131. These are inorganic pigments. Red CD 105 is white when unexcited, fluoresces in the orange-red region when excited by ultraviolet radiation, and has a median particle size of 7 microns. Red CD 106 is white when unexcited, fluoresces in the orange-red region when excited by ultraviolet radiation, and has a median particle size of 6 microns. Red CD 120 is white when unexcited, fluoresces in the red region when excited by ultraviolet radiation, and has a median particle size of 2.7 microns. Red CD 131 is white when unexcited, fluoresces in the red region when excited by ultraviolet radiation, and has a median particle size of 6.5 microns. It is preferred that the particle size of the aforesaid pigments is further reduced by suitable means including grinding and crushing for use in the preparation of the jet ink composition.

Examples of other fluorescent colorants include the porphyrin type dyes described in U.S. Pat. No. 5,256,193. These include, e.g., the tetra- chloride, bromide, tosylate, triflate, perchlorate, acetate, and fluoroborate salts of 5,10,15,20-tetrakis-(1-methyl-4-pyridyl)-21H,23H-porphine, 5,10,15, 20-tetrakis-(1-hydroxymethyl-4-pyridyl)-21H,23H-porphine, 5,10,15,20-tetrakis- [1- (2-hydroxyethyl)-4-pyridyl]-21H,23H-porphine, 5,10,15,20-tetrakis-[1-(3-hydroxypropyl)- 4-pyridyl]-21H,23H-porphine, 5,10,15,20-tetrakis-[1-(2-hydroxyethoxyethyl)-4-pyridyl]-21H,23H-porphine, and 5,10,15,20-tetrakis-[4-(trimethylammonio) phenyl]-21H,23H-porphine. These colorants are excitable in the 380–500 nm range, and fluoresce in the 600–800 nm range.

Further examples of fluorescent colorants include the organic dyes described in U.S. Pat. No. 5,093,147, including 3,3'-diethylthiatricarbocyanine iodide, 3,3'-diethyl-9,11-neopentylenethiatricarbocyanineiodide, 1,1',3,3,3',3'-hexamethyl-4,4',5,5'-dibenzo-2,2'-indotricarbocyanine iodide, 2-[7-[1,3-dihydro-1,1-dimethyl-3-(4-sulfobutyl)-2H-benz[e]indol-2-ylidene)-1,3,5-hepatrienyl]-1,1-dimethyl-3-(4-sulfobutyl) sodium salt, 3,3'-diethyl-4,4',5,5'-dibenzothiatricarbocyanine iodide, 5-chloro-2[2-[3-[5-chloro-3-ethyl-2(3H)-benzothiazolylidene-ethylidene]-2-(diphenylamino)-1-cyclopenten-1-yl]ethyl]-3-ethyl-perchlorate, 1,1'-diethyl-4,4'-dicarbocyanine iodide, and 2-[2-[2-(diphenylamino)-3[(3-(4-methoxy-4-oxobutyl)naptho[d]thiazol-2(3H)-ylidene-ethylidene]-1-cyclopenten-1-yl]ethenyl]3-(4-methoxy-oxobutyl)-perchlorate. These dyes are poorly absorptive of radiation in the visible range of about 400 to 700 nanometers, are highly absorptive of radiation in the near infrared range of at least about 750 nanometers in wavelength, and fluoresces in response to radiation excitation in the said near infrared range to produce fluorescent radiation of wavelengths longer than the wavelength of the excitation.

Any suitable amount of the colorant can be used to prepare the jet ink composition of the present invention. If the ultraviolet absorptivity or the fluorescent emission intensity is high, then a small amount of the colorant is sufficient. If the ultraviolet absorptivity or the fluorescent emission intensity is low, then the amount of the colorant used should be increased. The colorant is used preferably in an amount of from about 0.01% by weight to about 2% by weight of the jet ink composition, and more preferably in an amount of from about 0.1% by weight to about 1.0% by weight of the jet ink composition.

SOLVENTS

The jet ink composition of the present invention comprises one or more solvents. Any suitable solvent can be used in the preparation of the inventive jet ink composition, and preferably one or more organic solvents are employed. It is further preferred that the solvent evaporates rapidly under the printing conditions and without leaving behind a solvent residue. Organic solvents suitable for the preparation of the jet ink composition of the instant invention include ketones such as acetone, methyl ethyl ketone, diethyl ketone, cyclohexanone, and the like, esters such ethyl acetate, propyl acetate, butyl acetate, amylacetate, and the like, alcohols such methanol, ethanol, n-propanol, isopropanol, n-butanol, i-butanol, t-butanol, n-pentanol, n-hexanol, and the like, hydrocarbon solvents such as hexane, cyclohexane, heptane, benzene, toluene, xylene, and the like, glycols such as ethylene glycol, propylene glycol, glycerin, diethylene glycol, and the like, glycol ethers such as ethylene glycol dimethyl ether, ethylene glycol diethylether, cellosolve, diethylene glycol dimethylether, diethylene glycol diethylether, propylene glycol monomethyl ether, and the like, 1-methyl-2-pyrrolidone, and other solvents commonly known to those of ordinary skill in the art. Methyl ethyl ketone is a preferred solvent. If desired, a mixture of solvents may be used. For example, a small amount of an alcohol such as methanol or ethanol may be added to methyl ethyl ketone solvent.

Any suitable amount of the solvent can be used in the preparation of the jet ink composition of the present invention. The solvent is typically present in an amount of from about 30% to about 80% by weight, and preferably in an amount of from about 40% to about 75% by weight of the jet ink composition.

BINDER RESINS

The jet ink composition of the present invention comprises a binder resin which forms a film on the colorant and serves to improve the adhesion of the colorant and other ingredients to the printed surface. The binder resin is preferably colorless and thus does not impart visibility to the marks. Any suitable binder resin can be employed, and preferably a good film former is employed. A good film former rapidly forms a tough durable film as the result of the evaporation of the solvent.

It also is preferred that the binder resin has a melting point or softening point above about 60° C. It is further preferred that the melting or softening point is in the range of about 60–150° C., and it is even further preferred that the melting or softening point is in the range of about 60–110° C. It is further preferred that the binder resin has low water absorption, preferably below about 0.1%. It also is preferred that the binder resin has a low acid number, preferably below about 60, and more preferably the binder resin is neutral. It is further preferred that the binder resin is soluble in common organic solvents such as ketones, esters or aromatic hydrocarbons.

An example of a binder resin suitable for use in the present inventive ink composition is an acrylic resin, preferably a styrene-acrylic acid copolymer resin. Styrene-acrylic acid copolymer resins can be prepared by methods known to those of ordinary skill in the art. For example, a copolymer of styrene and methylacrylate can be prepared by any methods known to those of ordinary skill in the art including for example, free radical, ionic, or radiation polymerization methods. The copolymer thus prepared can be hydrolyzed by an acid to obtain the styrene-acrylic acid copolymer. Alternatively, a mixture of styrene and acrylic acid can be copolymerized by any suitable method, including the method using a free radical initiator. The styrene-acrylic acid copolymer can have any suitable molecular weight, preferably a molecular weight that does not produce ink compositions of unacceptably high viscosities. Thus, the average molecular weight of the copolymer is typically below about 50,000, preferably in the range of about 1,000–20,000, and more preferably in the range of about 5,000–10,000.

An example of a suitable commercially available styrene-acrylic acid resin is the JONCRYL-611™ resin sold by S. C. Johnson & Son, Inc., in Racine, Wis. The JONCRYL-611 resin is a styrene-acrylic acid copolymer having a molecular weight of about 8,100. The JONCRYL-611 resin has good pigment dispersion properties and is a good film former. It is a white solid flake, and has an acid number of 53 mg of KOH/g of resin, a softening point of 105° C., a glass transition temperature of 50° C., and a viscosity in toluene at 40% N.V. of 150 cps and at 60% N.V. of 2,500 cps. The resin is soluble in a variety of solvents including ketones, esters, and aromatic hydrocarbons.

Other examples of binder resins include the sulfonamide resins. For example, a suitable sulfonamide resin is a sulfonamide-formaldehyde resin. Sulfonamide-formaldehyde resins can be prepared by methods known to those of ordinary skill in the art. For example, a toluenesulfonamide-formaldehyde resin can be prepared by reacting a toluenesulfonamide with formaldehyde under suitable conditions.

An example of a commercially available toluenesulfonamide-formaldehyde resin is RIT-O-LITE MHP, sold by Rit-Chem co in Pleasantville, N.Y. RIT-O-LITE MHP resin is a colorless, neutral resin having a molecular weight in the range of about 100,000–200,000, a Gardner Color Index of maximum 3, a specific gravity at 25° C. of 1.25–1.35 g/cc, and a softening point of 70–75° C. The resin is soluble in ketones, esters, alcohols, plasticizers, and aromatic solvents.

Another example of a suitable sulfonamide binder resin is a toluenesulfonamide resin. A preferred toluenesulfonamide resin is the bisphenol A toluenesulfonamide resin having the formula (I) set forth below:

(I)

wherein n is 0 to about 10, and preferably n is 0 to about 5, and more preferably n is 0 to about 2. The methyl group on the toluenesulfonamide segment can be ortho, meta, or para to the sulfonamide group, and preferably para to the sulfonamide group. The toluenesulfonamide resin can be prepared by methods known to those of ordinary skill in the art. For example, bisphenol A can be condensed with epichlorohydrin, and the resulting product then reacted with toluenesulfonamide to produce the binder resin. Alternatively, epichlorohydrin can be reacted with toluenesulfonamide to produce a product having epoxy end groups. This product can then be condensed under suitable conditions with bisphenol A or a mixture of bisphenol A and epichlorohydrin to produce the binder resin. See e.g., Odian, *Principles of Polymerization* (1991), p. 134, and references cited therein.

An example of a commercial bisphenol A toluenesulfonamide resin is AD-PRO-MTS™, sold by Rit-Chem Co., can be represented by formula (I), is an off-white neutral resin having a softening point of about 68–70° C. (Ring & Ball method), a melt viscosity at 90° C. of 23,000 cps, and an average molecular weight of about 1000. The resin is soluble in esters and ketones, insoluble in aromatic and aliphatic hydrocarbons, and partially soluble in alcohols.

The binder resin can be present in the jet ink composition in any suitable amount. It is typically present in an amount of from about 5% by weight to about 50% by weight of the jet ink composition, preferably in an amount of from about 100 by weight to about 40% by weight of the jet ink composition, and more preferably in an amount of from about 12% by weight to about 35% by weight of the jet ink composition.

SURFACTANTS

The jet ink composition may further contain a surfactant, which may be anionic, cationic, nonionic, or amphoteric. Examples of anionic surfactants are, but are not limited to, alkylbenzene sulfonates such as dodecylbenzene sulfonate, alkylnaphthyl sulfonates such as butyl or nonyl naphthyl sulfonate, dialkyl sulfosuccinates such as diamyl sulfosuccinate, alcohol sulfates such as sodium lauryl sulfate, and perfluorinated carboxylic acids such as perfluorodecanoic acid and perfluorododecanoic acid.

Nonionic surfactants include the alkylesters of polyethylene glycol, fatty acid esters of glycerol, fatty acid esters of glycol, and the like, and fluorochemical surfactants such as FC 170C, FC 430, FC 431, FC 740, FC 120, FC 248, FC 352, FC 396, FC 807, and FC 824, which are available from 3M Co. FC 430 and FC 431 are fluoroaliphatic polymeric esters. Cationic surfactants include alkylamines, amine oxides, amine ethoxylates, alkyl hydroxyalkyl imidazolines, quaternary ammonium salts, and amphoteric surfactants include the alkylbetaines, the amidopropylbetaines, and the like.

Particular examples of surfactants include the polyoxyethylene adducts of fluoroaliphatic sulfonamido alcohols of the formula $R_fSO_2N(C_2H_5)(CH_2CH_2O)_xH$, wherein $R_f=C_nF_{2n+1}$, n is about 5–10 and preferably 7–9, and x is about 10–20 and preferably about 12–16. For example, FC 170C, a preferred surfactant, is 80% active, amber colored, and nonionic. FC 170C has the structure of $R_fSO_2N(C_2H_5)(CH_2CH_2O)_xH$, wherein $R_f=C_nF_{2n+1}$, n is about 8, and x is 14.

The surfactant may be present in the jet ink composition in any suitable amount. It is typically present in an amount of from about 0.01% to about 1% by weight of the jet ink composition, preferably in an amount of from about 0.1% to about 0.5% by weight of the jet ink composition, and more preferably in an amount of from about 0.2% to about 0.4% by weight of the jet ink composition.

PLASTICIZERS

The jet ink composition of the present invention includes one or more plasticizers which impart further blush resistance to the mark. The mechanism by which the plasticizer enhances the blush resistance has not been fully established. It is believed that the hydrophobic plasticizer prevents or retards the diffusion of water, especially hot water, into the film formed by the binder resin. Any suitable hydrophobic plasticizer having low vapor pressure can be used. The vapor pressure of the plasticizer is low, preferably below about 25 mm Hg at 240° C., and more preferably below about 15 mm Hg at 240° C. The plasticizer has a hydroxyl number below about 2 mg KOH/g and preferably below about 1 mg of KOH/g. The surface tension of the plasticizer is low, preferably below about 50 dynes/cm, and more preferably below about 40 dynes/cm at 25° C. The plasticizer has a low water solubility, preferably below about 0.01% by weight at 25° C., and more preferably below about 0.001% by weight at 25° C.

An example of a preferred class of plasticizers includes the alkyl benzyl phthalates, wherein the alkyl group has 1–10 carbon atoms, and more preferably, the alkyl group has 3–6 carbon atoms. It is even more preferred that the alkyl group is a butyl group, preferably in the ortho position to the carboxybenzyl group. An example of a suitable plasticizer is o-butyl benzyl phthalate, available from Monsanto Co., in St. Louis, Mo. as SANTICIZER™ 160, and has a vapor pressure of 10 mm Hg at 240° C., and 0.16 mm Hg at 1500C. o-Butyl benzyl phthalate has a surface tension of 39.9 dynes/cm at 25° C., and a water solubility of 0.0003% at 25° C.

The plasticizer can be present in the jet ink composition in any suitable amount. It is typically present in an amount of from about 1% to about 20% by weight, preferably in an amount of from about 2% to about 12% by weight, and more preferably in an amount of from about 2% to about 11% by weight of the jet ink composition.

ADHESION PROMOTERS

The jet ink composition of the present invention may further include an adhesion promoter to further improve the adhesion of the mark. Any suitable adhesion promoter can be utilized. Examples of adhesion promoters include organosilanes and organotitanates. Examples of organosilanes include trichlorosilane, vinyltrichlorosilane, methyltrichlorosilane, methyldichlorosilane, mimethyldichlorosilane, methylvinyldichlorosilane, hexamethyldisilizane, methyltriethoxysilane, methyltrimethoxysilane, vinyltriethoxysilane, vinyltrimethoxysilane, vinyl-tris(2-methoxyethyoxysilane), vinyltriacetoxysilane, gamma-methacryloxypropyl-trimethoxysilane, gamma-methacryloxypropyl-tris-(2-methoxyethoxy)silane, beta-(3,4-epoxycyclohexyl) ethyltrimethoxysilane, and gamma-glycidoxypropyltrimethoxysilane. Gamma-glycidoxypropyltrimethoxysilane is a preferred organosilane and is sold as Silane A-187 by Union Carbide Co. in Danbury, Conn.

Examples of organotitanates include transition metal organates such as titanium organates, zirconium organates, hafnium organates, and the like. Commercially available organates include the titanium organates sold by DuPont Chemical Co. under the tradename of TYZOR™ titanates. Examples of TYZOR titanates include TYZOR TBT, which is titanium tetra-n-butoxide, TYZOR TPT, which is titanium tri-isopropoxide, TYZOR GBA, which is titanium diisopropoxide bis(2,4-pentanedionate), TYZOR LA, which is titanium ammoniumlactate, and TYZOR AA, which is titanium acetylacetonate.

Any suitable amount of the adhesion promoter can be used, preferably in an amount of from about 0.1% by weight to about 5% by weight of the ink composition, and more preferably in an amount of from about 0.5% by weight to about 2% by weight of the ink composition.

HUMECTANTS

The ink composition of the present invention may further contain a humectant to prevent drying of the ink during the jet printing operation, as well as during storage of the ink. Humectants are hydrophilic solvents having high boiling points, preferably above 100° C., and more preferably in the range of from about 150° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether, dialkyl sulfoxides such as dimethyl sulfoxide, and other solvents such as sulfolane, N-methyl pyrrolidinone, and the like. Propyleneglycol monomethyl ether is a preferred humectant.

Any suitable amount of the humectant can be used, preferably in an amount of from about 0.5% by weight to about 5% by weight of the jet ink composition, and more preferably in an amount of from about 1% by weight to about 3% by weight of the jet ink composition.

ELECTROLYTES

The jet ink composition of the present invention may further contain an electrolyte to obtain the desired electrical conductivity of the jet ink composition. Any suitable electrolyte known to those of ordinary skill in the art can be used. Examples of suitable electrolytes include alkali and alkaline earth metal salts such as lithium nitrate, lithium chloride, lithium thiocyanate, lithium trifluoromethanesulfonate, sodium chloride, potassium chloride, potassium bromide, calcium chloride, and the like, and amine salts such as ammonium nitrate, ammonium chloride, dimethylamine hydrochloride, hydroxylamine hydrochloride, and the like.

Any suitable amount of the electrolyte can be used to achieve the desired electrical conductivity. The electrolyte is preferably present in the jet ink composition in an amount of from about 0.1% to about 2% by weight of the jet ink composition, and more preferably in an amount of from about 0.4% by weight to about 0.6% by weight of the jet ink composition. Excessive amounts of electrolyte may cause clogging of the jet nozzle and adversely affect the electrical conductivity of the jet ink composition.

OTHER ADDITIVES

The jet ink composition of the present invention may include additional ingredients, such as an acid or a base, to obtain the desired solubility of the various components, particularly the binder resin. For example, acetic acid can be added to improve the dissolution of the binder resin.

The jet ink composition of the present invention can be prepared by any suitable method known to those of ordinary skill in the art. For example, the components can be sequentially added to a mixer and blended until a smooth ink composition is obtained. The ink composition can be filtered, e.g., using a 5-micron sock filter, to remove any impurities.

The following examples further illustrate the present invention but, of course, should not be construed as in any way limiting its scope.

EXAMPLE 1

This example illustrates the preparation of an ink composition of the present invention using an acrylic binder resin.

| Components | % by Weight |
|---|---|
| JONCRYL-611 (binder resin) | 14.50 |
| Methyl ethyl ketone (solvent) | 66.70 |
| 1-Methyl 2-pyrrolidone (solvent) | 1.80 |
| Propyleneglycol monomethyl ether (humectant) | 4.60 |
| SANTICIZER 160 (plasticizer) | 10.80 |
| FC170C (surfactant) | 0.30 |

-continued

| Components | % by Weight |
|---|---|
| Potassium thiocyanate (conductive salt) | 1.00 |
| UVITEX OB (colorant) | 0.30 |
| | 100.00 |

The ink composition was prepared by combining the above components sequentially and mixing them in a mixer until a smooth solution was obtained. The ink composition as used to print marks on aerosol cans. The blush resistance was measured by immersing the thus printed cans in water at 150° F. for 5 minutes. The marks were found to be blush resistant. The marks also were found to be blush resistant when tested in boiling water at 212° F. for 5 minutes.

In another experiment, the cans marked with the jet ink composition were exposed to dry heat at 390° F. for 30 seconds. The marks were found to be unaffected by the heat exposure.

EXAMPLE 2

This example illustrates the preparation of an ink composition of the present invention using a toluenesulfonamide binder resin.

| Components | % by Weight |
|---|---|
| AD-PRO-MTS (binder resin) | 25.00 |
| Methyl ethyl ketone (solvent) | 64.60 |
| Propyleneglycol monomethyl ether (humectant) | 4.60 |
| SANTICIZER 160 (plasticizer) | 2.00 |
| FC170C (surfactant) | 0.30 |
| Silane A-187 (adhesion promoter) | 1.00 |
| Lithium trifluoromethanesulfonate | 2.00 |
| UVITEX OB | 0.50 |
| | 100.00 |

An ink composition was prepared as described in Example 1 using the above components. Aerosol cans were jet printed with the ink composition and tested as in Example 1. The marks were found to be blush resistant as well as heat resistant. The marks also were found to be blush resistant when tested in boiling water at 212° F. for 5 minutes.

EXAMPLE 3

This example illustrates the preparation of an ink composition of the present invention using a sulfonamide-formaldehyde binder resin.

| Components | % by Weight |
|---|---|
| RIT-O-LITE MHP (binder resin) | 35.00 |
| Methyl ethyl ketone (solvent) | 52.60 |
| Propyleneglycol monomethyl ether (humectant) | 4.60 |
| SANTICIZER 160 (plasticizer) | 2.00 |
| FC170C (surfactant) | 0.30 |
| Silane A-187 (adhesion promoter) | 1.00 |
| Potassium thiocyanate (conductive salt) | 1.00 |
| Acetic acid (pH adjuster) | 3.00 |
| UVITEX OB (colorant) | 0.50 |
| | 100.00 |

An ink composition was prepared as described in Example 1 using the above components. Aerosol cans were jet printed with the ink composition and tested as in Example 1. The marks were found to be blush resistant as well as heat resistant. The marks also were found to be blush resistant when tested in boiling water at 212° F. for 5 minutes.

The present invention provides jet ink compositions as described above wherein the solvent is present in an amount of from about 50% to about 75% by weight of the ink composition, the acrylic binder resin is present in an amount of from about 11% to about 17% by weight of the ink composition, the humectant is present in an amount of from about 1% to about 7% by weight of the ink composition, the plasticizer in an amount of from about 5% to about 15% by weight of the ink composition, the surfactant in an amount of from about 0.1% to about 0.5% by weight of the ink composition, the electrolyte in an amount of from about 0.5% to about 2.0% by weight of the ink composition, and the fluorescent colorant in an amount of from about 0.1% to about 1.0% by weight of the ink composition.

The present invention further provides jet ink compositions as described above, wherein the solvent is present in an amount of from about 40% to about 75% by weight of the ink composition, the toluenesulfonamide binder resin is present in an amount of from about 15% to about 35% by weight of the ink composition, the humectant is present in an amount of from about 1% to about 7% by weight of the ink composition, the plasticizer in an amount of from about 1% to about 5% by weight of the ink composition, the surfactant in an amount of from about 0.1% to about 0.5% by weight of the ink composition, the organosilane in an amount of from about 0.1% to about 5.0% by weight of the ink composition, the electrolyte in an amount of from about 0.2% to about 3.0% by weight of the ink composition, and the fluorescent colorant in an amount of from about 0.1% to about 1.0% by weight of the ink composition.

The present invention further provides jet ink compositions as described above, wherein the solvent is present in an amount of from about 40% to about 75% by weight of the ink composition, the sulfonamide-formaldehyde binder resin is present in an amount of from about 20% to about 40% by weight of the ink composition, the humectant is present in an amount of from about 1% to about 7% by weight of the ink composition, the plasticizer in an amount of from about 1% to about 5% by weight of the ink composition, the surfactant in an amount of from about 0.1% to about 0.5% by weight of the ink composition, the organosilane in an amount of from about 0.1% to about 3.0% by weight of the ink composition, the electrolyte in an amount of from about 0.2% to about 2.0% by weight of the ink composition, and the fluorescent colorant in an amount of from about 0.1% to about 1.0% by weight of the ink composition.

The present invention also provides a method of providing a blush resistant mark on a substrate for subsequent identification comprising applying onto the substrate a jet ink composition comprising a solvent, a fluorescent colorant, a binder resin, and a plasticizer having a vapor pressure of about 15 mm Hg or less at 240° C., and removing all or substantially all of the solvent.

The present invention further provides blush resistant marks produced by the above method.

The present invention further provides an improved method of identifying objects comprising providing an identifying mark on the objects, exciting the mark with an excitation radiation to obtain an emission radiation, and reading the emission radiation, the improvement comprising providing a blush resistant identifying mark using a jet ink composition comprising a solvent, a fluorescent colorant, a binder resin, and a plasticizer having a vapor pressure of about 15 mm Hg or less at 240° C.

The present invention further provides a system for identifying objects with an identification mark comprising an excitation means for exciting the mark and a fluorescence detecting means for detecting the fluorescent emission of the mark, wherein the mark is blush resistant and comprises a fluorescent colorant, a binder resin, and a plasticizer having a vapor pressure of about 15 mm Hg or less at 240° C. The system includes an excitation means such as an ultraviolet lamp and a emitted light detecting means. The system can include features and components generally known to those of ordinary skill in the art. See for example, U.S. Pat. No. 4,540,595. Thus, the system can include a transport means for transporting the items to the reading means which consists of a source of radiation having the appropriate wavelength and intensity. The reading means includes a photodetector reads the fluorescent emission. If necessary, the system can include optical filters to eliminate or minimize undesired radiation, and any pattern recognition circuitry appropriate to the particular code patterns recorded.

All of the references, including patents, patent applications, and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition suitable for producing marks on objects that are invisible to the unaided eye and are visible only when excited by an exciting radiation comprising an organic solvent, a fluorescent colorant, a binder resin selected from the group consisting of styrene-acrylic resins having an acid number of 53 or less and sulfonamide resins, and a butyl benzyl phthalate plasticizer, wherein said mark is blush resistant when exposed to water at a temperature of about 150° F. for a period of up to about 5 minutes.

2. The jet ink composition of claim 1, wherein said composition has (1) a viscosity of from about 1.6 to about 7.0 centipoises at 25° C.; (2) an electrical resistivity of from about 50 to about 2000 ohm-cm; and (3) a sonic velocity of from about 1100 to about 1700 meters/second.

3. The jet ink composition of claim 2, wherein said fluorescent colorant absorbs in the wavelength region of from about 275 nm to about 400 nm and fluoresces in the wavelength region of from about 420 nm to about 520 nm.

4. The jet ink composition of claim 3, wherein said fluorescent colorant comprises 2,2'-(2,5-thiophenediyl)-bis (5-tert-butylbenzoxazole).

5. The jet ink composition of claim 4, wherein said solvent comprises a ketone.

6. The jet ink composition of claim 5, wherein said ketone comprises methyl ethyl ketone.

7. The jet ink composition of claim 6, wherein said plasticizer comprises o-butyl benzyl phthalate.

8. The jet ink composition of claim 7, wherein said binder resin is a styrene-acrylic resin having an acid number of 53 or less.

9. The jet ink composition of claim 7, wherein said binder resin is a sulfonamide resin.

10. The jet ink composition of claim 9, wherein said sulfonamide resin is a toluenesulfonamide resin.

11. The jet ink composition of claim 9, wherein said sulfonamide resin is a sulfonamide-formaldehyde resin.

12. The jet ink composition of claim 8, further including a humectant.

13. The jet ink composition of claim 12, wherein said humectant is propyleneglycol monomethylether.

14. The ink composition of claim 10, further including a humectant.

15. The jet ink composition of claim 14, wherein said humectant is propyleneglycol monomethylether.

16. The jet ink composition of claim 11, further including a humectant.

17. The jet ink composition of claim 16, wherein said humectant is propyleneglycol monomethylether.

18. The jet ink composition of claim 13, further including a surfactant.

19. The jet ink composition of claim 18, wherein said surfactant is a polyoxyethylene adduct of a fluoroaliphatic sulfonamido alcohol.

20. The jet ink composition of claim 15, further including a surfactant.

21. The jet ink composition of claim 20, wherein said surfactant is a polyoxyethylene adduct of a fluoroaliphatic sulfonamido alcohol.

22. The jet ink composition of claim 17, further including a surfactant.

23. The jet ink composition of claim 22, wherein said surfactant is a polyoxyethylene adduct of a fluoroaliphatic sulfonamido alcohol.

24. The jet ink composition of claim 21, further including an organosilane.

25. The jet ink composition of claim 24, wherein said organosilane is gamma-glycidoxypropyl trimethoxysilane.

26. The jet ink composition of claim 23, further including an organosilane.

27. The jet ink composition of claim 26, wherein said organosilane is gamma-glycidoxypropyl trimethoxysilane.

28. The jet ink composition of claim 19, further including an electrolyte.

29. The jet ink composition of claim 28, wherein said electrolyte is potassium thiocyanate.

30. The jet ink composition of claim 25, further including an electrolyte.

31. The jet ink composition of claim 30, wherein said electrolyte is lithium trifluoromethanesulfonate.

32. The jet ink composition of claim 27, further including an electrolyte.

33. The jet ink composition of claim 32, wherein said electrolyte is potassium thiocyanate.

34. The jet ink composition of claim 29, wherein said solvent is present in an amount of from about 50% to about 75% by weight of the ink composition, said binder resin is present in an amount of from about 11% to about 17% by weight of the ink composition, said humectant is present in an amount of from about 1% to about 7% by weight of the ink composition, said plasticizer in an amount of from about 5% to about 15% by weight of the ink composition, said surfactant in an amount of from about 0.1% to about 0.5% by weight of the ink composition, said electrolyte in an amount of from about 0.5% to about 2.0% by weight of the ink composition, and said fluorescent colorant in an amount of from about 0.1% to about 1.0% by weight of the ink composition.

35. The jet ink composition of claim 31, wherein said solvent is present in an amount of from about 40% to about 75% by weight of the ink composition, said binder resin is present in an amount of from about 15% to about 35% by weight of the ink composition, said humectant is present in an amount of from about 1% to about 7% by weight of the ink composition, said plasticizer in an amount of from about 1% to about 5% by weight of the ink composition, said surfactant in an amount of from about 0.1% to about 0.5% by weight of the ink composition, said organosilane in an amount of from about 0.1% to about 5.0% by weight of the ink composition, said electrolyte in an amount of from about 0.2% to about 3.0% by weight of the ink composition, and said fluorescent colorant in an amount of from about 0.1% to about 1.0% by weight of the ink composition.

36. The jet ink composition of claim 33, wherein said solvent is present in an amount of from about 40% to about 75% by weight of the ink composition, said binder resin is present in an amount of from about 20% to about 40% by weight of the ink composition, said humectant is present in an amount of from about 1% to about 7% by weight of the ink composition, said plasticizer in an amount of from about 1% to about 5% by weight of the ink composition, said surfactant in an amount of from about 0.1% to about 0.5% by weight of the ink composition, said organosilane in an amount of from about 0.1% to about 3.0% by weight of the ink composition, said electrolyte in an amount of from about 0.2% to about 2.0% by weight of the ink composition, and said fluorescent colorant in an amount of from about 0.1% to about 1.0% by weight of the ink composition.

37. The jet ink composition of claim 2, wherein said mark is resistant to heat when exposed to a dry heat temperature of up to about 390° F. for a period of about 30 seconds.

38. The jet ink composition of claim 4, wherein said mark is resistant to heat when exposed to a dry heat temperature of up to about 390° F. for about 30 seconds.

39. The jet ink composition of claim 7, wherein said mark is resistant to heat when exposed to a dry heat temperature of up to about 390° F. for about 30 seconds.

40. The jet ink composition of claim 1, wherein said binder resin is a styrene-acrylic resin having an acid number of 53 or less.

41. The jet ink composition of claim 1, wherein said binder resin is a toluenesulfonamide resin.

42. The jet ink composition of claim 1, wherein said binder resin is a sulfonamide-formaldehyde resin.

43. The jet ink composition of claim 1, wherein said binder resin is a styrene-acrylic resin having an acid number of 53.

44. A method of providing a mark on a substrate for subsequent identification comprising applying onto said substrate a jet ink composition comprising an organic solvent, a fluorescent colorant, a binder resin selected from the group consisting of styrene-acrylic resins having an acid number of 53 or less and sulfonamide resins, and a butyl benzyl phthalate plasticizer, and removing all or substantially all of said solvent, wherein said mark is blush resistant when exposed to water at a temperature of about 150° F. for a period of up to about 5 minutes.

45. The method of claim 44, wherein said jet ink composition has (1) a viscosity of from about 1.6 to about 7.0 centipoises at 25° C.; (2) an electrical resistivity of from about 50 to about 2000 ohm-cm; and (3) a sonic velocity of from about 1100 to about 1700 meters/second.

46. The method of claim 45, wherein said fluorescent colorant absorbs in the wavelength region of from about 275 nm to about 400 nm and fluoresces in the wavelength region of from about 420 nm to about 520 nm.

47. The method of claim 46, wherein said fluorescent colorant comprises 2,2'-(2,5-thiophenediyl)bis(5-tert-butylbenzoxazole).

48. The method of claim 47, wherein said plasticizer comprises o-butyl benzyl phthalate.

49. The method of claim 47, wherein said binder resin is a selected from the group consisting of a styrene-acrylic resin having an acid number of 53 of less, a tolunesulfonamide resin, and a sulfonamide-formaldehyde resin.

50. The blush resistant mark produced by the method of claim 45.

51. The blush resistant mark produced by the method of claim 49.

52. In an improved method of identifying objects comprising providing an identifying mark on said objects, exciting said mark with an excitation radiation to obtain an emission radiation, and reading said emission radiation, the improvement comprising providing a mark using a jet ink composition comprising an organic solvent, a fluorescent colorant, a binder resin selected from the group consisting of styrene-acrylic resins having an acid number of 53 or less and sulfonamide resins, and a butyl benzyl phthalate plasticizer, wherein said mark is blush resistant when exposed to water at a temperature of about 150° F. for a period of up to about 5 minutes.

53. The improved method of claim 52, wherein said fluorescent colorant absorbs in the wavelength region of from about 275 nm to about 400 nm and fluoresces in the wavelength region of from about 420 nm to about 520 nm.

54. The improved method of claim 53, wherein said fluorescent colorant comprises 2,2'-(2,5-thiophenediyl)-bis(5-tert-butylbenzoxazole).

55. The improved method of claim 54, wherein said binder resin is selected from the group consisting of a styrene-acrylic resin having an acid number of 53 or less, a tolunesulfonamide resin, and a sulfonamide-formaldehyde resin.

56. A system for identifying objects with an identification mark comprising an excitation means for exciting said mark and a fluorescence detecting means for detecting the fluorescent emission of said mark, wherein said mark comprises a fluorescent colorant, a binder resin selected from the group consisting of styrene-acrylic resins having an acid number of 53 or less and sulfonamide resins, and a butyl benzyl phthalate plasticizer, wherein said mark is blush resistant when exposed to water at a temperature of about 150° F. for a period of up to about 5 minutes.

57. The system of claim 56, wherein said fluorescent colorant absorbs in the wavelength region of from about 275 nm to about 400 nm and fluoresces in the wavelength region of from about 420 nm to about 520 nm.

58. The system of claim 57, wherein said fluorescent colorant comprises 2,2'-(2,5-thiophenediyl)-bis(5-tert-butylbenzoxazole).

* * * * *